Feb. 21, 1933.  C. S. BRAGG ET AL  1,898,287
BRAKE SYSTEM FOR AUTOMOTIVE VEHICLES
Filed March 28, 1928  3 Sheets-Sheet 1
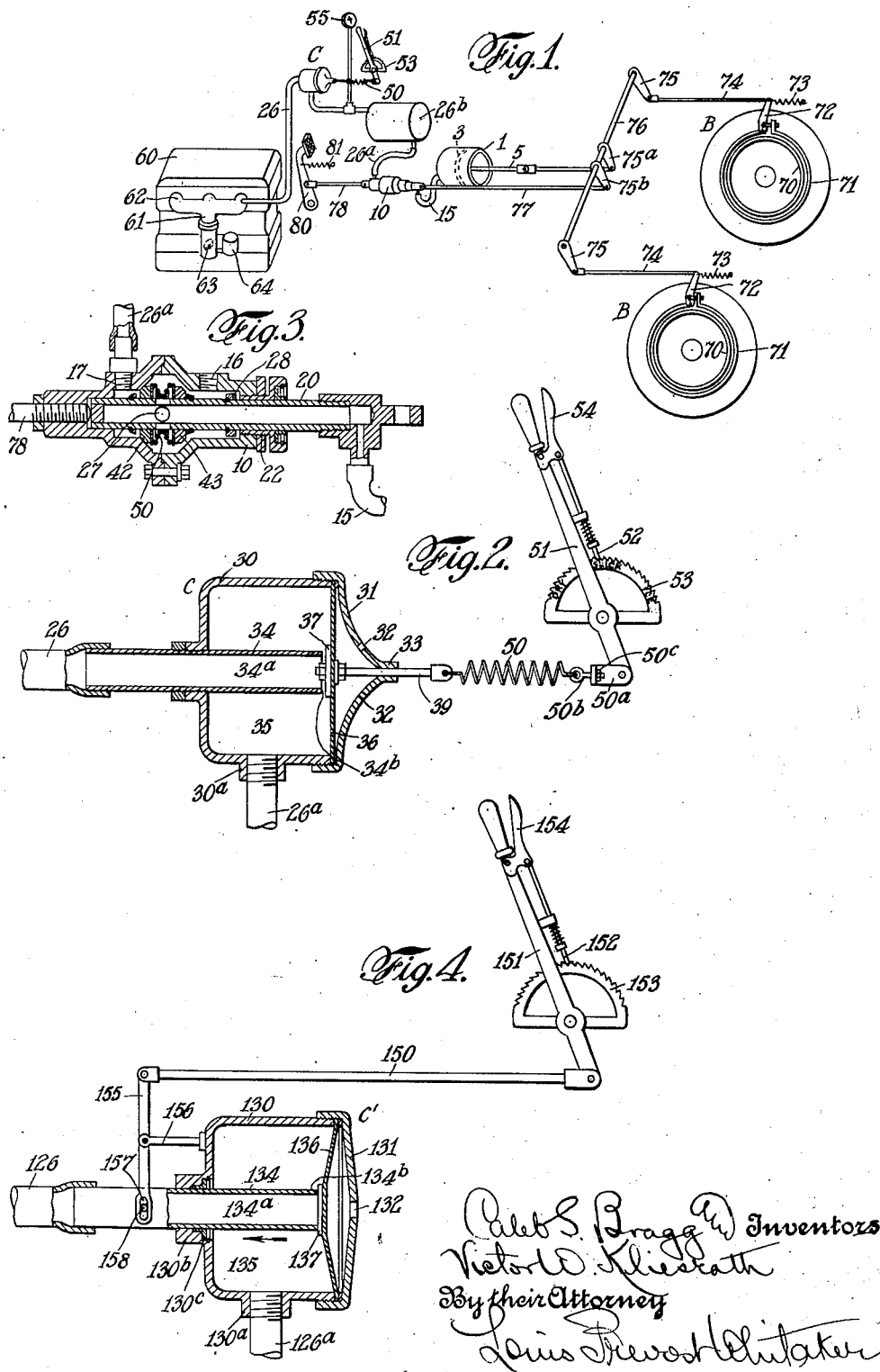

Feb. 21, 1933. C. S. BRAGG ET AL 1,898,287
BRAKE SYSTEM FOR AUTOMOTIVE VEHICLES
Filed March 28, 1928 3 Sheets-Sheet 2
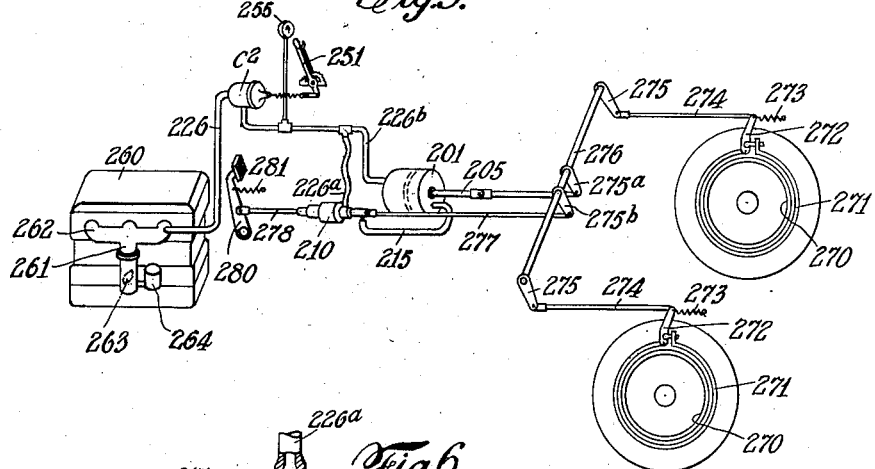
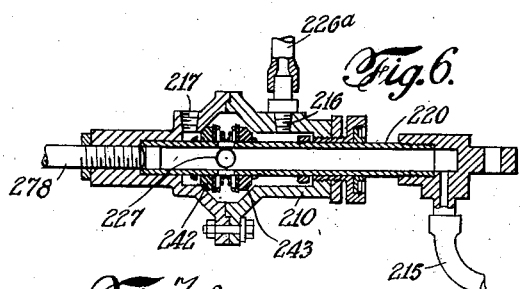
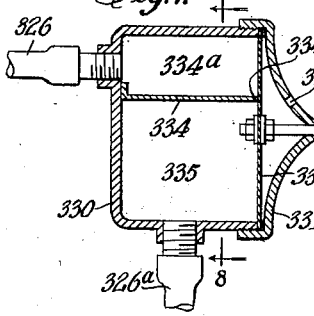
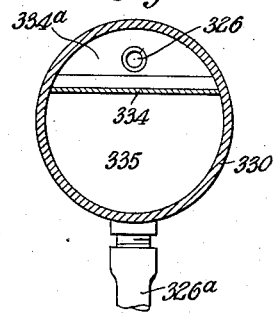
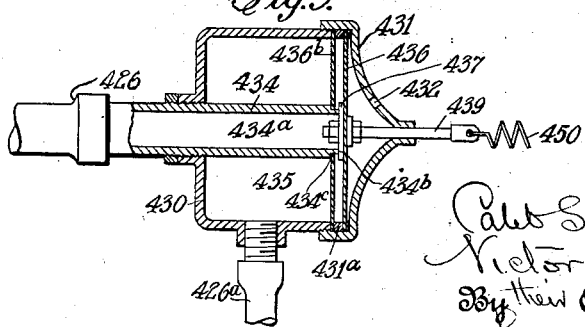

Feb. 21, 1933. C. S. BRAGG ET AL 1,898,287
BRAKE SYSTEM FOR AUTOMOTIVE VEHICLES
Filed March 28, 1928 3 Sheets-Sheet 3
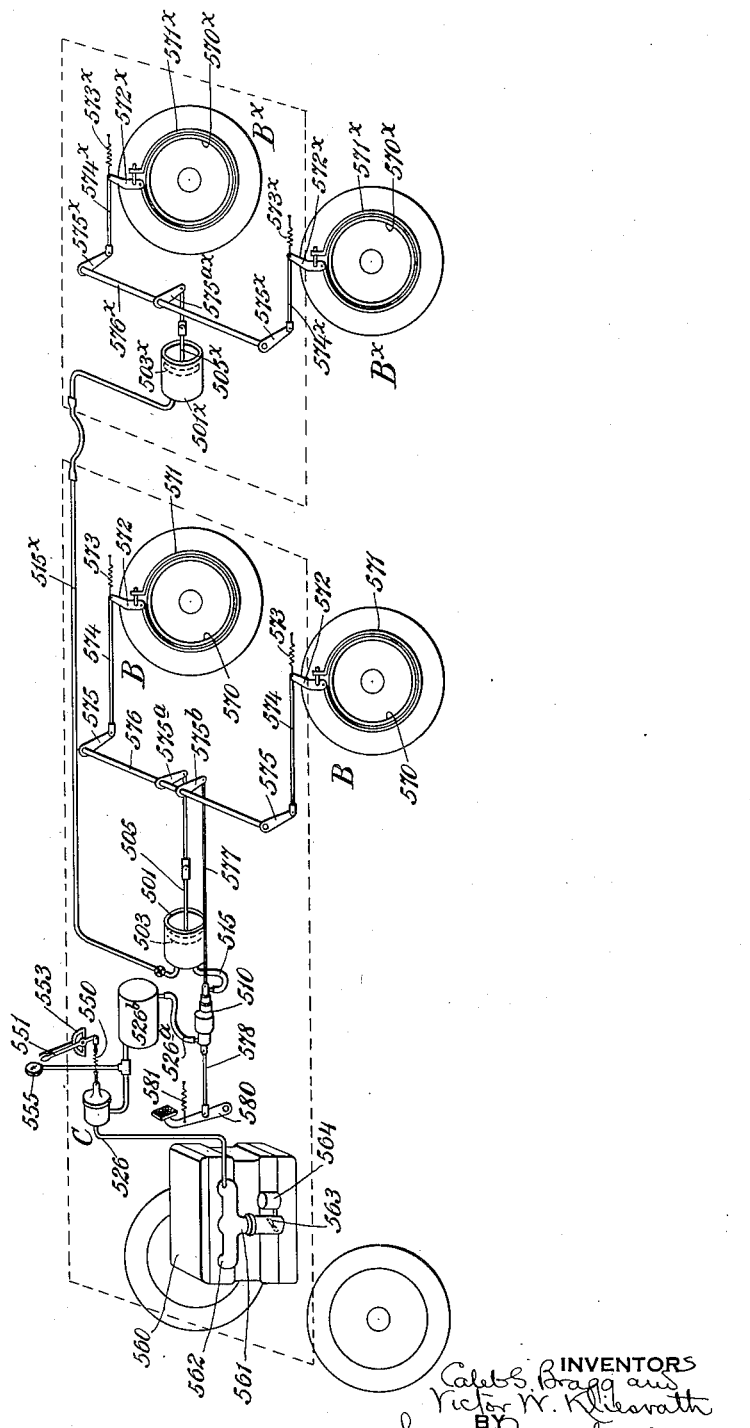

Patented Feb. 21, 1933

1,898,287

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed March 28, 1928. Serial No. 265,255.

Our invention consists in the novel features hereinafter described, reference being had to the accompanying drawings which show a number of embodiments of the invention selected by us for purposes of illustration, and the said invention is fully disclosed in the following description and claims.

Our present invention relates to vacuum or suction actuated brake systems for automotive vehicles, in which the suction or rarification is conveniently obtained by a connection to the throttle controlled portion of the suction passage of an internal combustion engine which drives the vehicle or vehicles, and in which the higher pressure fluid, usually atmospheric air, is at a substantially constant pressure, and it consists in the provision of a pressure regulating check valve interposed between the said portion of the suction passage of the engine and the controlling valve mechanism for the suction actuated device or power actuator, for automatically maintaining a constant and predetermined degree of rarification available for the operation of the suction actuated device, regardless of fluctuations in the degree of rarification in the suction passage of the engine, which may occur when the brakes are applied, and provided with means under control of the operator for varying the said constant degree of rarification to be maintained available for the operation of the suction actuated device from time to time to meet changes in the coefficient of friction between the wheel tires and the road surface, which may be due to variations in road conditions and also to variations in the load of the vehicle, so that the operator may adjust the said pressure regulating check valve, so as to secure a constant and predetermined differential of fluid pressures for operating the suction actuated device, which will enable the operator to apply the brake mechanisms with the maximum force of the actuator without locking the wheels upon the roadway over which the vehicle is passing, and thus obviating skidding. The pressure regulating check valve also functions as a check valve to prevent variations in the degree of rarification in the intake manifold from being transmitted through the controlling valve mechanism to the power actuator when the valve mechanism is in position to connect the power actuator with the suction passage and apply the brakes by power, where the piston of the actuator is normally submerged in atmosphere when in the released position and the actuator is not provided with a storage reservoir. The apparatus further serves as a check valve to maintain a vacuum storage sufficient to insure an emergency application of the brakes should the motor stall, where a vacuum storage tank is used with an actuator, the piston of which is submerged in atmospheric air in the released position, as shown for example in our former application for Letters Patent of the United States filed December 22, 1923, and given Serial No. 682,346, and also where the actuator piston is submerged in vacuum when in the released position, in which case the portion of the actuator cylinder forward of the piston provides a vacuum storage space, as disclosed for example in our former Letters Patent of the United States, No. 1,583,117 dated May 4, 1926, and it also serves to prevent the passage of gaseous mixture, which may be drawn into the suction pipe leading to the suction actuated device by reason of the fluctuations in the degree of rarification within the suction passage due to opening and closing of the throttle valve, from passing into the suction actuated device and the controlling valve mechanism therefor, where it might otherwise deteriorate the sealing members and possibly result in a destructive explosion in case of backfire.

Our invention also comprises certain novel features of construction and combination of parts hereinafter fully described and particularly pointed out in the claims.

In the accompanying drawings,

Fig. 1 is a diagrammatic view of an installation of brake mechanism in an automative vehicle showing our invention embodied therein, in connection with an actuator, the piston of which is submerged in atmosphere when in the released position.

Fig. 2 is an enlarged sectional view of the pressure regulating check valve shown in Fig. 1.

Fig. 3 is a sectional view of the controlling valve mechanism for the actuator, illustrated in Fig. 1.

Fig. 4 is a view similar to Fig. 2 showing a slight modification.

Fig. 5 is a view similar to Fig. 1 showing our invention embodies in connection with a suction actuated device, in which the piston thereof is maintained submerged in vacuum when in the released position.

Fig. 6 is a sectional view of the valve mechanism shown in Fig. 5.

Figs. 7 and 8 are sectional views illustrating another modification of our invention.

Fig. 9 is a sectional view of another modification of the pressure regulating check valve.

Fig. 10 is a diagrammatic view similar to Fig. 1, showing our invention embodied in a brake system for tractor and trailer.

In the drawings we have shown our invention applied in a brake system for an automotive vehicle in connection with a power actuator of the type in which the piston is normally maintained submerged in atmosphere, (or in other words the higher fluid pressure) when in the released or off position. The power actuator consists in this instance of a cylinder, 1, open to the atmosphere at one end and closed at the other end, and having a piston, 3, in the cylinder operatively connected with brake mechanisms of the vehicle, indicated as a whole at B, which may be of any desired type, but which are shown, for example, as comprising each a brake drum, 70, brake band, 71, brake applying lever, 72, having a retracting spring, 73, said brake lever being connected by a link rod, 74, with arms, 75, on a rock shaft, 76, having an arm, 75ª, connected with a piston rod, 5, of the piston, 3.

The actuator is provided with means for connecting the cylinder between the piston and the closed end of the cylinder with a source of suction and with a source of higher fluid pressure under the control of suitable controlling valve mechanism, which may be of any desired type. In this instance we have shown the controlling valve mechanism located exterior to the actuator, in linkage between the operator operated part and the brake mechanisms, and comprising a valve casing, 10, connected by a link rod, 78, with a foot lever, 80, having the usual retracting spring, 81, the valve casing being provided with oppositely disposed valves, indicated at 42, 43, operatively connected with a hollow valve actuating part, 20, which is connected by a link, 77, with an arm, 75ᵇ, on the rock shaft 76, thus connecting it with the piston, 3, and with the brake mechanisms. The particular construction of the valve mechanism herein shown is covered by our former application for Letters Patent of the United States, filed March 13, 1926, and given Serial No. 94,412, and forms no part of our present invention, and will not be further described in detail except to say that the relative movement of the valves with respect to the casing controls the actuator, and that the amount of lost motion between the valve actuating part and the valve casing is limited by suitable means, as collar, 28, on the part, 20, and an adjustable sleeve, 22, secured to the casing, to enable the operator to apply his physical force to the brake mechanisms in addition to that of the actuator, or to apply the brake mechanisms directly by physical force in case of failure of power. It will also be understood that the valves engage the valve actuating part, 20, with a sealing fit, and are normally pressed toward their seats by yielding means, as a spring, 50, interposed between them, the part, 20, being provided with means for opening one valve after permitting the other to be closed when moved longitudinally in either direction. The hollow valve actuating part, 20, communicates with the valve casing between the valves by an aperture, 27, and communicates exteriorly of the valve casing with the cylinder forward of the piston by a flexible pipe, 15. The valve casing is provided with an inlet, 16, on one side of the valves for the higher pressure fluid, which in this instance communicates with the atmosphere, and said casing has an outlet aperture, 17, on the other side of the valves, communicating by suction pipe, 26, 26ª, with the throttle controlled portion of the suction passage, 61, (as the intake manifold, 62) of an internal combustion engine, 60, for propelling the vehicle or vehicles, being connected to the suction passage between the throttle valve, indicated at 63, and the engine cylinders, the suction passage being also provided with the usual carburetor, 64. Where desired, a vacuum storage tank, indicated at 26ᵇ, may be inserted in the suction line, as indicated in Fig. 1, and where used it will provide a vacuum storage sufficient to insure an emergency application of the brakes should the motor stall.

In the suction pipe or connection, 26, 26ª, between the controlling valve mechanism for the actuator and the throttle controlled portion of the suction passage of the engine, is located an adjustable pressure regulating check valve, indicated as a whole at C in Figs. 1 and 2, the preferred form of which is shown in detail in the latter figure.

This pressure regulating check valve comprises a hollow valve casing closed at one end and provided at the other end with a cap, or cover, preferably screwed or otherwise secured thereto, and having a centrally located guiding aperture, the cover being also provided, if desired, with one or more apertures communicating with the atmosphere. Within the valve casing is a diaphragm and a partition member provided with a seat adapted to engage the diaphragm and separating the interior of the chamber, when the diaphragm is seated, into two chambers, which are brought into communication when the diaphragm is unseated. The areas of the apertures communicating with said chambers, which are closed by the diaphragm when seated, are unequal, and the interior chamber having the aperture of smaller area is in communication with the throttle controlled portion of the suction passage of the engine, while the chamber having the larger aperture is in communication with the portion of the suction pipe leading to the controlling valve mechanism. The diaphragm is provided with a yielding device, as a spring, acting thereon in a direction to normally unseat the diaphragm against the atmospheric pressure on its outer face, said spring being provided with calibrating adjusting means and a hand operated tension regulating means for varying the tension of the spring in accordance with variations in the coefficient of friction between the vehicle wheels and the roadway.

In the preferred form of the device as illustrated in Fig. 2, the valve casing is indicated at 30, and is provided with a cap or cover, 31, having air inlet aperture, 32 (communicating with the atmosphere, and a centrally located guiding aperture, 33. The valve casing is provided in this instance with a centrally located stand pipe, or partition member, 34, which divides the interior of the valve casing into the chamber, 34ª, within the standpipe, and a larger chamber, 35, surrounding the standpipe. The inner end of the standpipe is provided with a seat, 34ᵇ, for engaging a flexible diaphragm, 36, or pressure operated member, which has its outer edges in sealing engagement with the valve casing, and preferably clamped, as shown, between the casing and the cap or cover, 31. The diaphragm, 36, is preferably reinforced by a centrally located portion, indicated at 37, the area of which may be sufficient, as shown, to cover the seat, 34ᵇ, of the standpipe, 34, and form an air tight joint therewith, where the diaphragm is made of material such as rubberized or impregnated fabric, which will not readily form an air tight seat engaging portion. The diaphragm, 36, is provided with a suitable stem, 39, which is connected with the diaphragm, and the centrally located reinforcing portion, 37, if that is used, by an air tight connection, said stem extending through the guiding aperture, 33, in the cover, and being connected with a spring, 50, provided with suitable means for adjusting the tension thereof. In this instance the spring is connected through a link, 50ª, with an adjusting lever, 51, provided with a spring actuated locking pawl, 52, engaging a rigid segment, 53, and connected with a pawl releasing lever, 54, pivotally mounted on the lever, 51. We also prefer to interpose an adjusting device between the spring, 50, and the hand operated device, as the lever, 51, and in this instance we have shown a threaded eye bolt, 50ᵇ, provided with an adjusting nut, 50ᶜ, for connecting the spring 50, with the link, 50ª. The stationary part, as the ratchet segment 53, with respect to which the hand operated regulating lever, 51, is movable, is conveniently provided with indications, such as the words Dry, Slick, Ice, Loaded, Medium, and Light, for example, or other suitable indications, to indicate variations in the coefficient of friction between the vehicle wheels and the roadway, which may be due either to the condition of the road or the load condition of the vehicle to which the adjusted positions of the hand operated lever, 51, correspond, and in which positions of the lever the tension of the spring will be such as to provide the desired maximum rarification for operating the brake mechanisms by power to the maximum extent of the power of the actuator without locking the wheels to which the brake mechanisms are applied. The special adjusting means, 50ᵇ, 50ᶜ, for the spring provide a convenient means for calibrating the spring to secure the desired tension in the different positions of the hand regulating lever, 51.

The hand regulating device or lever, 51, is located within convenient reach of the operator, and by moving it to different positions in which it will be held by its locking means, a delicate adjustment of the tension of the spring, 50, may be obtained.

The chamber, 34ª, within the stand pipe is connected by the suction pipe, 26, with the throttle controlled portion of the suction passage of the engine, and the larger chamber, 35, is provided with the lateral aperture, 30ª, in the casing, 30, which is connected by a portion, 26ª, of the suction line with the controlling valve mechanism, in this instance through the vacuum storage tank, 26ᵇ.

The diaphragm, 36, when the engine is in operation, is exposed to a differential of fluid pressures, to wit, the differential between the atmospheric pressure on its outer face and the sub-atmospheric pressure within the casing, 30, or within the stand pipe, 34, or both. The tension of the spring tends to pull the diaphragm, 36, and its seat engaging portion, 37, in a direction away from the seat, 34ᵇ, in opposition to the differential of fluid pressures acting on the diaphragm. In Fig. 2 the diaphragm is shown in an unseated position, which it will occupy when the engine is not running and no rarification exists in the suction passage. The extent of the opening between the diaphragm or its seat engaging portion, 37, and the seat, depending upon the tension of the spring. If the hand operated lever, 51, is placed in such position that the spring, 50, exerts practically no tension on the diaphragm when the engine is not running, and if the engine is then started and the throttle valve is closed, to produce rarification in the suction passage, 62, the suction pipe, 26, and the chamber, 34ª, within the stand pipe, 34, air will be exhausted from the surrounding chamber, 35, and the spaces connected therewith, through the pipe, 26ª, and in the vacuum storage tank, 26ᵇ, if the latter is used, and when a comparatively slight degree of rarification is created within the chambers, 34ª and 35, the diaphragm will be moved inwardly by the air pressure on its outer face into engagement with the seat 34ᵇ, thus cutting off the connection between the chamber, 35, and the suction passage of the engine, and a comparatively small degree of rarification will exist within the chamber, 35, and the spaces connected therewith, including the portion, 26ª, of the suction valve, the controlling valve mechanism, and the actuator cylinder, or cylinders, if the valve mechanism has been moved into the position to connect the cylinders with a source of suction. As the tension of spring, 50, is increased by adjusting the lever, 51, the diaphragm will be held unseated until an increased differential of pressures on the opposite faces of the diaphragm overcomes the increased tension of the spring and causes the diaphragm to seat and again close off the connection between the chamber, 35, and the suction passage, 62, but in this case maintaining an increased degree of rarification within the valve chamber, 35, and the connected spaces leading to the controlling valve mechanism. The operator may, therefore, by moving the hand operated lever, 51, to secure varying adjustments of the spring, 50, regulate the degree of rarification available for operating the suction actuated power actuator, and the maximum available rarification will be provided when the tension of the spring, 50, is so adjusted as to substantially equal the maximum differential of fluid pressures on the diaphragm, which amounts to approximately 10 pounds per square inch, that is to say, the difference between atmospheric pressure and the maximum rarification obtained in the intake manifold or the engine, which is represented approximately by 20 inches of mercury.

The controlling valve mechanism for the power actuator is normally maintained when in the released position, in such position as indicated in Fig. 3, as to connect the cylinder of the actuator forward of the piston with the atmosphere. When it is desired to apply the brake mechanisms by power, assuming that the engine is running and the throttle valve closed or partly closed, the operator will depress the foot pedal, 80, and shift the valve casing and valves with respect to each other, so as to connect the actuator cylinder, 1, forward of the piston with the suction pipe, 26ª, and air will be withdrawn from the actuator cylinder, 1, into the chamber, 35, of the valve casing, 30, (through the vacuum storage tank, 26ᵇ, if the latter is used) thereby increasing the pressure on the inner face of the diaphragm, 36, and thus reducing the differential of fluid pressures tending to move the diaphragm against the tension of spring, 50, into the seated position, and permitting the spring, 50, to draw the diaphragm outwardly and away from the seat, placing the chamber, 35, in communication with the chamber, 34ª, within the stand pipe, so that air continues to be withdrawn from the cylinder of the suction actuated device and the valve chamber, 35, until the rarification in the chamber, 35, again increases to such a degree that the differential of fluid pressures on the diaphragm exceeds the resistance of the spring as determined by the setting of the hand lever, 51, when the diaphragm will seat. The withdrawal of air from the actuator cylinder forward of the piston permits the pressure of the atmosphere on the rear face of the piston of the actuator to move the piston forward and apply the brake mechanism with maximum force dependent upon the differential between the atmospheric pressure on the piston and the degree of rarification in the forward end of the cylinder, which of course corresponds with that in the chamber, 35, when the controlling valve mechanism is maintained in the position to apply the brakes. It is obvious, therefore, that by adjusting the tension of the spring, 50, the maximum capacity of the suction actuated device to apply the brake mechanisms may be varied under the control of the operator, independently of the controlling valve mechanism, 10.

The coefficient of friction between the tires of the wheels of the vehicle and the roadway varies considerably, due to conditions of the roadway, as to whether it is dry, or wet, or covered with snow or ice, for example, and also under varying loads supported by the wheels. It is very desirable not to permit the brakes to be applied with so much power as to lock the wheels, as the vehicle is caused to skid, and an accident may, and frequently does, result. Obviously a maximum braking power, which may be safely applied to the wheels of a loaded vehicle on a dry roadway, without danger of locking the wheels, will lock the wheels when the vehicle is lightly loaded, or is moving over wet or muddy, or snow or ice covered roads. It is desirable, therefore, that the operator be provided with just the amount of maximum available power the brakes require, without locking the wheels, under these varying conditions, independently of the controlling valve mechanism for applying the brakes. It has, furthermore, been found desirable, and has become general practice with vacuum brake systems, to force the operator to do a certain amount of physical work, either while applying the brakes by power, or to supplement the power applications of the brakes with physical force for a full application of the brakes. In the latter case, the physical force exerted by the driver is directly applied to the brake mechanisms, in addition to the force being applied by the power cylinder or cylinders connected therewith, with the result that on wet or icy streets, the operator will have very little feel of the amount of work being done by the brake cylinders, due to the fact that the wheels will be locked by power applications alone before any pressure has been built up on the pedal lever to resist and warn the operator. The danger of skidding is furthermore increased, due to the fact that the operator has little warning before the movement of his foot may apply the brakes with too much power. According to our present invention, the operator may reduce the force of the power actuator to any desired extent, so that he may have a full and natural feeling of resistance on the foot pedal without locking the wheels by power applications of the brakes, regardless of road conditions or load conditions, and there is therefore less danger of applying the brakes unintentionally with so much power as to lock the wheels. This is readily accomplished according to our invention, by adjusting the tension of the spring, 50, by means of the hand lever, 51, and its locking means, as before described.

In order that the device shall also act as a check valve, it is necessary that the area of the portion of the inner face of the diaphragm exposed to the pressure within the larger chamber, 35, when the diaphragm is seated, shall be sufficiently greater than the area of the diaphragm exposed to the pressure within the smaller chamber, 34ª, within the standpipe, that the differential of fluid pressures upon the outer face of the diaphragm and upon the portion of the inner face thereof exposed to the pressure in the chamber, 35, when a predetermined degree of rarification exists in said chamber will not be overcome by the tension of the spring, 50, plus any increase in pressure on the small area of the diaphragm exposed to the pressure within the chamber, 34ª, thus enabling the atmospheric pressure on the exterior face of the diaphragm to hold the diaphragm seated for a suitable space of time, even though the pressure within the chamber, 34ª, communicating with the suction passage may rise to approximately atmospheric, as when the throttle valve is fully opened, or should the engine stop.

As a matter of fact, after the diaphragm or its seat engaging portion has been brought into contact with the seat by the rarification in the chamber, 35, air will continue to be withdrawn from the chamber, 35, and connected spaces until sufficient additional pressure is exerted on the outer face of the diaphragm to make an air-tight or sealing engagement with its seat. Such additional pressure can only be obtained from increased rarification within the chamber, 35, as the rarification in the chamber, 34ª, is maximum when the throttle valve is closed, which is its correct position when the brakes are to be applied. The rarification in the chamber, 35, therefore, holds the diaphragm so tightly seated that a reduction of rarification within the chamber, 34ª, will not be sufficient to enable the spring, 50, to unseat the diaphragm, but at most would only cause it to decrease the sealing pressure between the diaphragm and its seat, which might cause a slight leakage of air. Such leakage, however, would take a considerable time to effectively decrease the rarification within the chamber, 35, and its connected spaces, depending of course upon the cubic contents thereof.

Assuming that the engine is running and that air has been exhausted from the chamber, 35, and connected spaces, through suction pipe, 26ª, to the predetermined extent, determined by the adjustment of the spring, 50, and that the diaphragm is tightly seated, should the motor stall or the pressure in the suction passage rise to approximately atmospheric pressure, this pressure will be transmitted to the inner face of the diaphragm exposed to chamber, 34ª, but will not be sufficient to effect the unseating of the diaphragm on account of the small area of the valve in proportion to the total area of the diaphragm. The diaphragm will, therefore, remain seated for a certain period of time until the leakage of air between the valve seat and valve reduces the rarification within the valve chamber, 35, and decreases the differential of fluid pressures on the lateral portions of the diaphragm to a point where it will no longer overcome the tension of the spring, when of course the diaphragm will become unseated. The period of time that the valve will be thus held closed will depend upon the character of the seat engaging and sealing portion of the diaphragm, i. e., the type of material used for the valve and valve seat, and this period may extend over four or five minutes, or even longer, which is ample for practical purposes, as a motor vehicle will rarely be operated for such a period without the knowledge of the driver that the motor has stalled, and that the device, therefore, acts sufficiently well as a check valve for the purpose for which it is used, and it will maintain a sufficient degree of rarification within the chamber, 35, and the connected spaces, for a sufficient time to hold the brakes as applied to stop the vehicle, should the motor stall, during or after an application of the brakes.

When a storage reservoir is used, as shown in Fig. 1, or where the actuator cylinder is normally maintained submerged in vacuum, as shown in Fig. 5, and hereinafter described, the vacuum will be held for an emergency application of the brakes even if the engine should stall, and the device will also act as a check valve to prevent gaseous mixture from being carried into the suction pipe, vacuum reservoir and connected spaces, by fluctuations in the degree of rarification within the intake manifold, due to the opening and closing of the throttle valve, as for example, when the throttle valve is opened fully after it has been previously closed and the maximum degree of rarification produced in the reservoir and its connections, which gaseous mixture might find its way into the cylinder of the actuator. The accummulation of liquid fuel, which might otherwise find its way into the suction actuated device, might destroy the lubrication thereof and injure the valves and packings, and it might also cause an explosion in the pressure regulating valve, or in the suction actuated device, should the motor back fire. As there is always a certain amount of rarifications in the intake manifold, from two to three inches of mercury, when the throttle is fully open, and usually a greater degree of rarification, as motor vehicles are not usually operated for long periods with the throttle valve fully opened, there is consequently less tendency for the diaphragm to become unseated while the motor is running than while the motor is stopped, and therefore, the device as shown and described operates as a check valve with sufficient efficiency for all practical purposes for which it is intended.

In Fig. 4 we have shown a slight modification of our invention, in which the adjustment of the pressure regulating check valve is accomplished by a movement of the standpipe longitudinally with respect to the valve body, or casing, and the diaphragm. In this case we dispense with an auxiliary spring and depend upon the inherent resiliency of the diaphragm, which normally tends to hold the valve carried thereby away from the end of the standpipe. In this figure the parts which correspond with those previously described are given the same reference numerals with the addition of 100. In this form of our invention, the valve body, or casing, 130, is provided with a sleeve, 130ᵇ, through which the standpipe, 134, is capable of sliding longitudinally, the said sleeve, 130ᵇ, being provided with a sealing device, or stuffing box, indicated at 130ᶜ, for maintaining a gas-tight connection between the standpipe and the valve body, or casing. The valve body is provided with the cover, 131, having an air inlet aperture, 132, and the diaphragm, 136, is constructed and supported as previously described, and may be provided with a valve portion, 137, for engaging the end of the standpipe, 134. When the diaphragm is subjected to a sufficient differential of fluid pressures, the diaphragm, will flex and seat upon the standpipe, 134. The adjusting lever, 151, which is provided with the segment, 153, attached to the dash or other part of the vehicle, not shown, the pawl, 152, and pawl lever, 154, is connected by a link, 150, with one end of a lever, 155, pivotally mounted on a bracket, 156, secured to the valve casing, also secured to the dash or other part of the vehicle, not shown, and the other end of the lever is provided with slots, 157, which engage trunnions, 158, on the exterior portion of the standpipe, 134. While moving the adjusting lever, 151, the standpipe can be moved longitudinally with respect to the valve casing, so as to bring the valve seat at the inner end of the standpipe closer to, or further away from, the valve, 137. It is obvious that if the standpipe is moved in the direction of the arrow Fig. 4, away from the valve, 137, a greater differential of fluid pressures will be required to flex the diaphragm against the yielding resistance provided by its inherent elasticity, in order to seat the valve, 137, on the end of the standpipe, and by adjusting the standpipe in the direction opposite that indicated by the arrow in Fig. 4, a smaller differential of fluid pressures will be required to seat the valve, 137, against the resistance of the diaphragm. In this construction, as in the construction previously described, the diaphragm is yieldingly held when the valve, 137, in the open position, and by adjusting the standpipe longitudinally to the desired position, the desired degree of rarification available for the operation of the suction actuated device will be provided under the control of the operator. The apparatus shown in Fig. 4 operates in exactly the same manner, except for this matter of adjustment, and the description of its operation need not be repeated.

In Fig. 5 we have illustrated diagrammatically, an installation in an automotive vehicle embodying our invention in connection with a power actuator in which the piston is normally maintained submerged in vacuum when in the released position. In this figure, and in Fig. 6, which shows the valve mechanism for controlling the actuator, the parts corresponding with those illustrated in Figs. 1, 2 and 3, are given the same reference characters with the addition of 200, to avoid unnecessary repetition. In this installation the flexible continuation, 226ᵃ, of the suction pipe, 226, is connected to the aperture, 216, of the valve casing, while the aperture, 217, is open to the atmosphere, and the hollow valve actuating sleeve, 220, is connected by the flexible pipe, 215, with the cylinder, 201, of the actuator in rear, of the piston, the cylinder, 201, being closed at both ends, and being connected forward of the piston by a branch pipe, 226ᵇ, with the suction pipe, 226. The pressure regulating check valve, indicated at C2, is located in the suction pipe, 226, between branch pipes, 226ᵃ and 226ᵇ, and the suction passage of the engine. It follows from this construction that since the valve, 243, which is in this instance the suction valve, is normally maintained in the open position, as indicated in Fig. 6, the cylinder, 201, will be connected on both sides of the piston with the intake manifold, and when the engine is running rarification will be effected in the cylinder on both sides of the piston to the extent determined by the adjustment of the pressure regulating check valve, C2, which operates in the manner hereinbefore described. The pressure regulating check valve, C2, may also act as a check valve as previously described, and will thus maintain a substantially constant rarification within the cylinder, 201, the portion of which forward of the piston acts as a vacuum storage reservoir, or space, so that without any extraneous tank in the suction line an emergency application of the brakes can be made, should the motor stall.

While we have shown in Figs. 2 and 4, a form or embodiment of our pressure regulating check valve, in which a centrally located standpipe is employed to form a chamber directly communicating with the source of suction which is separated from the adjacent chamber communicating with the suction actuated device when the diaphragm is seated on the end of the standpipe, we desire it to be understood that this particular construction is not essential, as the arrangement of the associated chambers adapted to be separated when the diaphragm is seated, may be provided in other ways. For example, in Figs. 7 and 8, we have shown a modification in which the valve casing, indicated at 330, is provided with a partition indicated at 334, having a seat portion, 334ᵇ, at its upper end adapted to be sealingly engaged by the diaphragm, 336, and to thereby divide the interior of the valve casing into two compartments, 334ᵃ and 335, the smaller of which may be connected with the intake manifold by pipe. 326, and the larger of which is connected to the pipe, 326ᵃ, leading to the valve mechanism for the suction actuated device. As will be readily understood, the pressure regulating check valve illustrated in Figs. 7 and 8 will operate in the same manner as hereinbefore described with reference to the construction illustrated in Figs. 2 and 4, and may function as a check valve if the areas of the diaphragm exposed to the chambers are correctly proportioned.

In some cases it may be desirable to provide a pressure regulating check valve with a check valve separate from the diaphragm, and we have shown such a construction in Fig. 9 of the drawings. In this figure, 430, represents the valve casing, which is provided with the standpipe, 434, providing the interior chamber, 434ᵃ, separated from the exterior chamber, 435. In this instance the standpipe is provided with a seat, 434ᵇ, at its inner extremity to be sealingly engaged by the diaphragm, 436, which may be provided if desired with a reinforcing seat engaging portion, indicated at 437. The standpipe is also provided with an annular shoulder, indicated at 434ᶜ, which forms a second annular seat surrounding the seat, 434ᵇ, and adapted to be engaged by the inner edges of a flexible ring or valve, 436ᵇ, having its outer marginal portions in sealing engagement with the outer edges of the casing and preferably clamped in engagement therewith, by the cover, 431, a spacing ring or washer, 431ᵃ, being inserted between the outer edges of the ring, 436ᵇ, and the edges of the diaphragm, 436. The diaphragm is provided with the stem, 439, to which is connected the calibrated variable tension spring, 450, secured to a manually operated adjusting device in the manner substantially as indicated in Fig. 2, for example. It will be understood that the standpipe, 434, is connected with the suction pipe, 426, and that the chamber, 435, of the valve casing is connected with the pipe, 426ᵃ, leading to the suction actuated device. In this construction it will be seen that the diaphragm, 436, will operate in exactly the same manner as hereinbefore described, to effect the pressure regulating function, and will be held off of its seat, 434ᵇ, by its spring, 450, permitting the exhaustion of air through the pipe, 426ᵃ, and chamber, 435, past the check valve, 436ᵇ, and thence through chamber, 434ᵃ, and suction pipe, 426, until the degree of rarification within the valve casing subjects the diaphragm, 436, to a differential of fluid pressures sufficient to overcome the tension of the spring, 450, as adjusted. In this construction it is immaterial whether or not the relative cross-sectional areas of the chambers, 434ᵃ and 435, are such that the differential of fluid pressures on the diaphragm will hold the valve portion, 437, seated in case of a rise of pressure in the standpipe or chamber, 434ᵃ, as in such case any rise of pressure within the standpipe, if sufficient to unseat the diaphragm, would immediately seat the check valve, 436ᵇ, upon its seat, 434ᶜ, and prevent any rise of pressure within the chamber, 435. The embodiment of our invention just described, and which is illustrated in Fig. 9, is not specifically claimed herein, as it forms the subject matter of a separate application for Letters Patent of the United States filed by us April 16, 1929, and given Serial No. 355,618, which is a division of this application.

It is to be understood that the forms of valve which we have shown in Figs. 2, 4 and 7, for purposes of illustration will each function not only as a pressure regulating valve, but as a check valve when the areas of the different portions of the diaphragm exposed to the pressures within the respective chambers of the valve are correctly proportioned, and provided further, that the suction passage is connected with the chamber to the pressure in which the smaller area of the diaphragm is exposed. It will also be understood that these devices will operate as pressure regulating valves in any case, regardless of the proportions of the areas of the diaphragm exposed to the pressures within the respective chambers of the valve, and without regard to the particular chamber which is connected with the suction passage of the engine and with the power actuator.

In Fig. 10, in which the parts corresponding with those illustrated in Fig. 1 are given the same reference numerals with the addition of 500, we have shown our invention applied to a brake system for a tractor vehicle and a trailer connected therewith. The tractor vehicle is indicated in dotted lines at A, and the parts of the brake system therefor are constructed and operate as shown and described with reference to Fig. 1. The trailer is indicated by dotted lines at T, and the wheels thereof are provided with brake mechanisms, Bx, Bx, operatively connected with the piston rod, 505x, of an auxiliary power actuator having a cylinder 501x, and piston, 503x. In this figure the portion of the main actuator cylinder, 501, forward of the piston is shown connected with the corresponding portion of the auxiliary actuator cylinder, 501x, by a pipe, 515x, having a flexible portion extending between the cylinders. It will be obvious that the controlling valve mechanism will control both actuators to apply and release, and hold the brakes of the tractor and trailing vehicles under the control of the pressure regulating check valve.

What we claim and desire to secure by Letters Patent is:—

1. In a brake system for automotive vehicles provided with an internal combustion engine for propelling the vehicle, said engine being provided with a throttle control suction passage, said brake system being further provided with a suction actuated power actuator connected with said aforementioned suction passage, a pressure regulating check valve interposed between said power actuator and said suction passage, comprising a casing provided with a chamber connected with the throttle controlled portion of said suction passage, and a chamber communicating with said power actuator, said chambers being open at their inner ends and provided with seating means, a pressure operated part having marginal portions in sealing engagement with said casing, and having its outer face subjected at all times to the pressure of a higher pressure fluid, said pressure operated part being subjected to yielding resistance tending to hold it in unseated position, and being adapted to be forced into seating engagement with said seating means, to disconnect said chambers from each other when the differential of fluid pressures on its opposite faces is sufficient to overcome said resistance, the area of the inner face of said pressure operated part exposed to the pressure in the chamber connected with the power actuator being sufficiently greater than the area exposed to the pressure in said chamber connected with the suction passage, to hold said pressure operated part in seated position when rarification exists in the chamber connected with said controlling valve mechanism, regardless of variations in the degree of rarification in the suction passage, whereby a substantially constant maximum differential of fluid pressures is maintained available for the operation of said actuator, and explosive mixture is prevented from passing beyond the seating means of said pressure regulating check valve.

2. In a brake system for automotive vehicles provided with an internal combustion engine for propelling the vehicle, said engine having a throttle control suction passage, said system further provided with a suction actuated power actuator connected with said suction passage, a pressure regulating check valve interposed between said power actuator and said suction passage, comprising a casing provided with a chamber connected with the throttle controlled portion of said suction passage, and a chamber communicating with said power actuator, said chambers being open at their inner ends and provided with seating means, a pressure operated part having marginal portions in sealing engagement with said casing, and having its outer face subjected at all times to the pressure of a higher pressure fluid, said pressure operated part being subjected to yielding resistance tending to hold it in unseated position, and being adapted to be forced into seating engagement with said seating means, to disconnect said chambers from each other when the differential of fluid pressures on its opposite faces is sufficient to overcome said resistance, the area of the inner face of said pressure operated part exposed to the pressure in the chamber connected with the power actuator being sufficiently greater than the area exposed to the pressure in said chamber connected with the suction passage, to hold said pressure operated part in seated position when rarification exists in the chamber connected with said power actuator, regardless of variations in the degree of rarification in the suction passage, whereby a substantially constant maximum differential of fluid pressures is maintained available for the operation of said actuator, and backflow explosive mixture is prevented from passing to said controlling valve mechanism, and the actuator, and hand operated means located within reach of the operator and operable while the vehicle is moving for varying the degree of said resistance to vary the maximum differential of fluid pressures available for the operation of the actuator in accordance with variations in the coefficient of friction between the vehicle wheels and the roadway.

3. In a brake system for automotive vehicles provided with an internal combustion engine for propelling the vehicle, said engine having a throttle control suction passage, and said system being further provided with a suction actuated power actuator having a connection with said suction passage, a pressure regulating check valve interposed between said power actuator and said suction passage, comprising a casing, a partition member therein dividing the casing into two chambers, and provided with seating means, tubular connections from one of said chambers to the throttle controlled portion of said suction passage, a tubular connection from the other of said chambers leading to said power actuator and said actuator, a pressure operated part having marginal portions in sealing engagement with said casing, and having its outer face subjected at all times to the pressure of the said higher pressure fluid, yielding means connected with said pressure operated part and acting upon it in a direction to hold it in unseated position, said pressure operated part being held in seated relation with said seating means, to disconnect said chambers from each other whenever the differential of fluid pressure on its opposite faces is sufficient to overcome the tension of said yielding means, the area of the inner face of said operator operated part exposed to the pressure in the chamber connected with the power actuator, being sufficiently greater than the area exposed to the pressure in the chamber connected with the suction passage, to hold said pressure operated part in seated position when a predetermined degree of rarification exists in the chamber connected with said power actuator regardless of fluctuations in the degree of rarification in the other of said chambers, whereby a substantially maximum differential of fluid pressures is maintained available for the operation of said actuator, and explosive mixture is prevented from passing from the suction passage beyond said pressure regulating check valve.

In testimony whereof we affix our signatures.

CALEB S. BRAGG.
VICTOR W. KLIESRATH.